United States Patent [19]

Farrissey et al.

[11] 4,374,791

[45] Feb. 22, 1983

[54] PROCESS FOR PREPARING PARTICLEBOARD

[75] Inventors: William J. Farrissey, Northford; Alexander McLaughlin, Meriden; Douglas P. Waszeciak, Hamden, all of Conn.

[73] Assignee: The Upjohn Company, Kalamazoo, Mich.

[21] Appl. No.: 306,199

[22] Filed: Sep. 28, 1981

[51] Int. Cl.³ .............................................. B28B 7/04
[52] U.S. Cl. ..................................... 264/39; 264/109; 264/127; 264/338
[58] Field of Search .................. 264/39, 127, 338, 109

[56] References Cited

U.S. PATENT DOCUMENTS

| | | | |
|---|---|---|---|
| 2,540,962 | 2/1951 | Puppolo | 264/39 |
| 3,925,530 | 12/1975 | Rees | 264/338 |
| 4,064,208 | 12/1977 | Hanning | 264/338 |
| 4,257,995 | 3/1981 | McLaughlin et al. | 264/109 |
| 4,257,996 | 3/1981 | McLaughlin et al. | 264/122 |
| 4,258,169 | 3/1981 | Prather et al. | 264/109 |

FOREIGN PATENT DOCUMENTS 2921689 12/1980 Fed. Rep. of Germany.
2921726 12/1980 Fed. Rep. of Germany.

*Primary Examiner*—James R. Hall
*Attorney, Agent, or Firm*—Denis A. Firth; John Kekich

[57] ABSTRACT

Particle boards are currently prepared by treating the particles (e.g. wood chips) with a binder comprising an organic polyisocyanate and an internal release agent and then subjecting the treated particles to a forming process involving heat and pressure. While the resulting particle board will generally release well from the caul plates of the press after forming, due to the effect of the internal release agent, it has been found that the ease of release is enhanced by precoating the surfaces of the caul plates or platens which come into contact with the particle board with a layer of polytetrafluoroethylene which layer optionally contains an internal release agent.

8 Claims, No Drawings

PROCESS FOR PREPARING PARTICLEBOARD

BACKGROUND OF THE INVENTION

1. Field of the Invention

This invention is concerned with an improved process for the preparation of particle board and is more particularly concerned with a process for pretreating the caul plates or platens of the press employed in preparing particle boards using an organic polyisocyanate as the binder.

2. Description of the Prior Art

The use of organic polyisocyanates in admixture with an internal release agent as the binder composition in the preparation of particle board is now well established in the art. U.S. Pat. Nos. 4,257,995/6 and 4,258,169 describe the use of certain organic phosphates, thiophosphates, pyrophosphates and related phosphorus-containing compounds as internal release agents in such binder compositions. German Offenlegungschrift Nos. 2,921,689 and 2,921,726 show the use of organic sulfonic acids and derivatives as internal release agents in similar organic polyisocyanate binder compositions.

The above types of binder compositions, comprising an organic polyisocyanate and an internal release agent, are generally applied to the particles employed to form the particle board, either neat or in the form of an aqueous emulsion, prior to forming the particle board from the treated particles using heat and pressure. The organic polyisocyanate and release agent can be admixed prior to application to the particles or, in a less preferred mode of operation, the two components of the binder composition can be applied separately to the particles. The particles (e.g. wood chips and other cellulosic or non-cellulosic material which is capable of being compressed and bound into the form of a board as discussed more fully hereafter) after being treated with the binder composition are then formed into boards using the action of heat and pressure. The necessary heat and pressure is generally applied utilizing a heavy duty press with heated metal platens. However, other forms of heat such as radio frequency radiation can be used. In many instances caul plates are employed and these are interposed between the platens of the press and the boards. In continuous forming operations, continuous belts may be used in place of individual caul plates. The caul plates or continuous belts are generally fabricated from aluminum, cold-rolled steel, hot rolled steel, or stainless steel. The press platens themselves are usually hot rolled steel.

Using the above compositions containing the aforesaid mold release agents it is found that the particle board, after being formed, will release readily from the surface of the caul plates, or from the platens if no caul plates are employed, without the need to apply any manual or mechanical force to effect separation of the board and caul plates or platens. Further, it is found that such release generally occurs readily throughout a prolonged production run of such particle boards involving a pressing cycle of approximately 5 minutes per board of ½" thickness. However, it is sometimes found, particularly in the case of caul plates or platens which have been fabricated from cold rolled steel, that a deposit of binder composition can build up on the periphery of the surface of the caul plates or platens immediately surrounding the outer edges of the area of the metal surface which comes into contact with the particle board. This deposit of material results from slight leakage of binder composition from the edges of the mat during the pressing of the particle board. After prolonged operation of the caul plates or platens this buildup of residue, which residue can become degraded by heat as the production run progresses, can interfere with the ease with which the particle boards will release from the metal surface during the removal operation.

It has also been found that the ease with which the particle boards will release from the caul plates or platens when using polyisocyanate binders in association with internal release agents can vary to a significant extent according to the nature of the particles being used. Illustratively, boards which are prepared using higher density hardwood chips such as those derived from oak show a significantly greater tendency to adhere to the platens than do boards prepared from soft wood chips such as those derived from pine and the like cellulosic materials.

We have now found that the ease of release of particle boards from the surface of the caul plates or platens used in their preparation can be enhanced by precoating, as described below, the surfaces of the caul plates or platens which come into contact with the particle boards during the pressing process. This finding not only helps obviate the occasional difficulties described above, but can, in many cases, enable the level of release agent incorporated into the binder composition to be significantly reduced. It is to be noted that the precoating of the caul plate or platen surface does not enable one to dispense with the use of the internal release agent but merely to reduce the level thereof in certain cases.

SUMMARY OF THE INVENTION

This invention comprises an improved process for the preparation of particle board in which particles of material capable of being compacted are contacted with a polyisocyanate binder containing an internal release agent and the treated particles are subsequently formed into boards by the application of heat and pressure utilizing metal caul plates or platens, wherein the improvement comprises enhancing the release of the finished particle board from the metallic surfaces which are in contact with said particle board during said application of heat and pressure, by precoating said metallic surfaces with a layer of polytetrafluoroethylene.

DETAILED DESCRIPTION OF THE INVENTION

The improved process of the invention is carried out in accordance with the procedures which are well-described in, for example, the aforesaid U.S. Pat. No. 4,257,995/6 whose disclosures are specifically incorporated herein by reference, the only departure from such procedures being the precoating of the caul plates or platens of the press used in the preparation of the particle board.

In the majority of particle board manufacturing operations metallic plates, known as caul plates, are interposed between the platens of the press and the surface of the mat which is being formed into a particle board by application of heat and pressure. In some cases, however, caul plates are not used and the surface of the platens of the press comes into direct contact with the mat. It is to be understood that the precoating which is the principal feature of the process of this invention is applied to the metallic surfaces which are to come into contact with the mat being formed into the particle board whether these surfaces are those of caul plates if used or those of the press platens whenever the caul plates are not used. Where reference is made hereafter to treatment of the caul plates or platens in the alternative it is to be understood that it is only intended that the platens of the press be the recipients of the coating of polytetrafluoroethylene in those cases in which no caul plates are employed.

The precoating operation in accordance with the invention can be carried out utilizing any of the methods known in the art for the coating of metal surfaces with polytetrafluoroethylene; see, for example, Kirk-Othmer, Encyclopedia of Polymer Science and Technology, Vol. 13, pp. 639–645, John Wiley and Sons, New York, 1970. Illustrative of such methods are the application of a thin layer using a spray of polytetrafluoroethylene in organic solvent solution or in the form of a dispersion in an aqueous medium. The spraying can be accomplished conveniently using any standard paint spray equipment and employing techniques conventional in the art of spraying thin films of material. Where the surface area to be covered is relatively small the spraying can be accomplished readily using an aerosol propellant to dispense from an appropriate container. Advantageously, the amount of polytetrafluoroethylene which is applied to the plates or platens in accordance with the invention is within the range of about 0.005 g/ft$^2$ to about 0.1 g/ft$^2$ and preferably the said amount is in the range of about 0.015 g to about 0.04 g/ft$^2$.

Other methods of applying a coating of polytetrafluoroethylene to the plates or platens in accordance with the invention include sinter coating, prefabrication of a film or sheet and attachment thereof to the surface of the platen using appropriate adhesives, and the like. The polytetrafluoroethylene can also be applied in combination with other polymers such as polyphenylene sulfide, urea-formaldehyde resins and the like, which are commonly employed as carriers for polytetrafluoroethylene in release coatings. In place of polytetrafluoroethylene itself there can also be used copolymers of tetrafluoroethylene with other polymerizable monomers.

As stated previously the coating of the plates or platens of the press with a layer of polytetrafluoroethylene on the surfaces which come into contact with the particle board, does not permit the use of polyisocyanate alone, i.e. in the absence of an internal release agent, as the binder composition in the formation of said particle board. Thus, when polyisocyanate alone is used as the binder composition, it is found that the first few particle boards made therefrom show relatively good release from plates or platens coated in accordance with the invention. However, a residue quickly builds on the surface of the plates or platens and the ease of release of the pressed boards therefrom quickly disappears.

However, although it is not possible to operate successfully by utilizing plates or platens coated with polytetrafluoroethylene without also employing an internal release agent in combination with the polyisocyanate, it is found that, in many cases, it is possible to reduce the amount of internal release agent below the level at which it would be necessary to employ it if the plates or platens were not so coated.

In a particular embodiment of the invention a release agent can be incorporated into the composition which is employed to precoat the caul plates or platens of the press. Such release agents can include any of those previously known in the art. Illustrative of such agents are those set forth in U.S. Pat. Nos. 4,257,995/6 and 4,258/169 and German OLS 2,921,689 and 2,921,726. Preferred release agents which are employed in this manner are the pyrophosphates derived from mono- and di-alkyl acid phosphates of which lauryl mono- and di-acid phosphates, and mixtures thereof, are typical. When a release agent is employed in combination with the polytetrafluoroethylene used to precoat the plates or platens, it is generally present in an amount corresponding to about 20 to about 300 parts per 100 parts by weight of polytetrafluoroethylene.

Subject to the precoating of the caul plates or platens of the press in the manner described above the procedure employed in the preparation of particle boards in accordance with the process of the invention is essentially that employed previously in the art when using a polyisocyanate binder in combination with an internal release agent; see the art cited above and the description set forth in the various examples given below.

The particles which are employed in making boards in accordance with the invention comprise particles of cellulosic and like material capable of being compacted and bonded into the form of boards. Typical such materials are wood particles derived from lumber manufacturing waste such as planer shavings, veneer chips, and the like. Particles of other cellulosic material such as shredded paper, pulp or vegetable fibers such as corn stalks, straw, bagasse and the like, and of non-cellulosic materials such as scrap polyurethane, polyisocyanurate and the like polymer foams can also be used. Inorganic materials such as hydrated alumina, gypsum, chopped mineral fibers and the like can also be employed either alone or in combination with any of the above cellulosic or non-cellulosic materials.

The following examples describe the manner and process of making and using the invention and set forth the best mode contemplated by the inventors of carrying out the invention but are not to be construed as limiting.

Example 1

A series of wood particle boards was prepared from white oak wood chips (disc flaked particles) using the following procedure.

2850 g. of the wood chips (moisture content=150 g.) were placed in a rotating drum blender and the latter was rotated while the particles were sprayed, using a paint spray gun, with 85.5 g. of isocyanate binder resin containing internal release agent. The binder comprised a mixture of polymethylene polyphenyl polyisocyanate (equiv. wt.=133; functionality 2.8) and the pyrophosphate derived from a mixture of mono- and dilauryl acid phosphate. The pyrophosphate was present in an amount corresponding to 7.0 percent by weight based on total binder resin. Tumbling of the wood particles in the blender was continued for 1 minute after all the resin binder had been introduced. An aliquot (90 g.) of the coated particles was then formed into a felted mat (5"×6") on a 12"×12" stainless steel plate using a plywood frame. Prior to forming of the first mat thereon the plate had been sprayed with a proprietary polytetrafluoroethylene aerosol spray (MS-136; Miller-Stephenson Chemical Company, Inc., Danbury, CT) to form a layer of polytetrafluoroethylene having a thickness of approximately 0.017 g/ft$^2$ on the surface which was to contact the particle board. After removal of the forming frame from the mat, steel bars having a thickness of ¼" corresponding to the desired thickness of the final particle board, were placed along two opposing edges of the aforesaid steel plate and a second 12"×12" chrome-plated stainless steel caul plate, coated with a layer of polytetrafluoroethylene in the same manner as the first plate on the face which was to contact the particle board, was placed on top of the mat. The complete assembly was then placed on the lower platen of a Dake press having a capacity of 100,000 lbs. of force. Both platens of the press were preheated to 350° F. Pressure was applied to the plates and mat gradually until the force exerted reached 500 psi. The pressure was held at this level for 3 minutes before being released. The particle board was then removed from the press.

A total of 30 boards was prepared in succession without any further treatment of the plates and, in no instance, was any evidence of sticking or adhesion between the pressed board and the plates observed. In all cases the board released from the plates without any need for manual intervention.

In contrast, when the above operation was repeated exactly as described but replacing the resin binder there used by the same polymethylene polyphenyl polyisocyanate alone without any pyrophosphate present therein it was only possible to prepare 9 successive boards before significant adhesion of particle board to the plates was observed.

Example 2

Using the spraying procedure and apparatus described in Example 1 a batch of 3800 g. of Aspen wafers (length 1½": width variable: thickness 0.02") having a moisture content of 200 g. was impregnated with 114 g. of the same polyisocyanate-pyrophosphate binder resin employed in Example 1. Aliquotes, each of 80 g., of the impregnated wood chips were then formed into boards using the procedure and apparatus described in Example 1 with the following exceptions. The caul plate was not used on top. The wood chip mat was formed on a caul plate and forming pressure was applied directly using the upper press platen without an intervening caul plate. One matching half of the top platen of the press was precoated with the polytetrafluoroethylene aerosol MS-136 as described in Example 1. The second matching half of each platen was precoated by application of an aqueous dispersion obtained by preblending equal parts by weight of polyphenylene polysulfide, polytetrafluoroethylene and the pyrophosphate derived from a mixture of lauryl mono- and di-acid phosphates and dispersing 3 parts by weight of said blend in 97 parts by weight of water. The composition was applied in amount sufficient to deposit a layer of about 0.02 g/ft$^2$ thickness on the platen. Both platens of the press were preheated to 350° F. and the total press time employed for each aliquot was 3 minutes with a 30 second close time to reach 500 psi. A series of 37 such boards was prepared under the above conditions. Good release was shown by the boards from the surfaces of the platen which had been treated with the aerosol spray but some slight sticking was observed at the perimeter of the mat on the surface of the platen coated using the aqueous spray. The sticking was so slight that manual release of the boards was not required.

Example 3

Using the spraying procedure and apparatus described in Example 1 a batch of 3600 g. of Ponderosa pine chips (⅜" hammer milled) having a moisture content of 400 g. was impregnated with 180 g. of the same pyrophosphatepolyisocyanate binder resin employed in Example 1.

A series of 36 boards was then pressed using the procedure and apparatus described in Example 1 but replacing the caul plates there used by caul plates fabricated from Carbo 13 steel (Berndorf). The surface of each of the caul plates which came into contact with the particle board was coated, prior to the first pressing only, with an aqueous dispersion of polytetrafluoroethylene (S-144: 5% solids: Miller-Stephenson Chemical Co., Inc.) using a paint spray gun to achieve a coating having a thickness of about 0.02 g/ft$^2$. The pressing times, temperatures and pressures were those recorded in Example 1. Excellent release from the caul plates was observed in the case of all 36 boards so prepared.

When the above experiment was repeated as described except that the caul plates were precoated using an aqueous dispersion of the pyrophosphate derived from a mixture of mono- and di-lauryl acid phosphate, severe sticking of the finished board to the caul plates was observed after only five boards had been prepared.

Example 4

Using the spray procedure and apparatus described in Example 1, 3800 g. of Aspen wafers (same as those used in Example 2) having a moisture content of 200 g. was impregnated with 114 g. of the same pyrophosphate-polyisocyanate binder resin employed in Example 1.

A series of 40 boards was then pressed using the procedure and apparatus described in Example 1 with the exception that the 12"×12" chrome plated stainless steel top caul plate was replaced by a sintered PTFE steel caul hung against the upper platen. Excellent release from the hanging caul was observed in the case of the 40 boards so prepared.

When the above experiment was repeated with a polymethylene polyphenyl polyisocyanate alone and a new sintered PTFE hanging caul was used, the board stuck to the hanging caul on the 15th pressing.

Example 5

Using the spray procedure and apparatus described in Example 1 a batch of 1900 g. of Aspen wafers having a moisture content of 100 g. was impregnated with 77 g. of isocyanate binder resin containing internal release agent. The binder comprised a mixture of polymethylene polyphenyl polyisocyanate (equiv. wt.=133; functionality of 2.8) with an alkylbenzene sulfonic acid (Sulframin 1298-Witco). The sulfonic acid was present in an amount corresponding to 10 percent by weight based on the total binder resin.

A series of 20 boards was pressed using the procedure described in Examples 1 and 4 with the exception that the hanging caul used in Example 4 was fastened to the top platen. Excellent release from this caul was observed in the case of the 20 boards so prepared.

What is claimed is:

1. In a process for the preparation of particle board wherein particles of material capable of being compacted are contacted with a polyisocyanate binder containing an internal release agent and the treated particles are subsequently formed into boards by the application of heat and pressure utilizing metal caul plates or platens, the improvement which comprises enhancing the release of the finished particle board from the metallic surfaces which come into contact with said particle board during said application of heat and pressure, by precoating said metallic surfaces with a layer of polytetrafluoroethylene.

2. An improved process in accordance with claim 1 wherein the layer of polytetrafluoroethylene is applied in the form of an aerosol spray.

3. An improved process in accordance with claim 1 wherein the layer of polytetrafluoroethylene is applied in the form of an aqueous dispersion.

4. An improved process in accordance with claim 1 wherein the precoating of said metallic surfaces is achieved by sintering.

5. An improved process in accordance with claim 1 wherein the precoating of said metallic surface is achieved by covering said surface with a preformed film of polytetrafluoroethylene.

6. An improved process according to claim 1 wherein the metallic surfaces which are coated are surfaces of steel selected from the class consisting of cold-rolled steel, hot rolled steel, and stainless steel.

7. An improved process according to claim 1 wherein a release agent is incorporated in the layer of polytetrafluoroethylene.

8. An improved process according to claim 7 wherein the release agent is the pyrophosphate derived from a mixture of lauryl mono- and di-acid phosphates.

* * * * *